(12) United States Patent
Huang

(10) Patent No.: US 7,445,195 B1
(45) Date of Patent: Nov. 4, 2008

(54) PULLEY

(76) Inventor: Han-Ching Huang, No. 12, Alley 111, Lane 437, Chen Hsing Road, Taichung (TW)

( * ) Notice: Subject to any disclaimer, the term of this patent is extended or adjusted under 35 U.S.C. 154(b) by 0 days.

(21) Appl. No.: 11/937,528

(22) Filed: Nov. 9, 2007

(51) Int. Cl.
*B66D 3/04* (2006.01)

(52) U.S. Cl. .................. 254/391; 254/409; 254/223

(58) Field of Classification Search ............... 254/391, 254/409, 411, 902, 371, 223, 217
See application file for complete search history.

(56) References Cited

U.S. PATENT DOCUMENTS

| | | | | |
|---|---|---|---|---|
| 395,113 | A * | 12/1888 | Skyba | 254/391 |
| 516,268 | A * | 3/1894 | Hartz | 254/405 |
| 5,368,281 | A | 11/1994 | Skyba | 254/391 |
| 5,722,640 | A * | 3/1998 | Skyba | 254/333 |
| 5,957,432 | A * | 9/1999 | Ostrobrod | 254/368 |
| 6,068,242 | A * | 5/2000 | Kingery | 254/391 |
| 6,092,791 | A * | 7/2000 | Kingery | 254/371 |
| 6,149,133 | A * | 11/2000 | Skyba | 254/391 |
| 6,446,936 | B1 * | 9/2002 | Ostrobrod | 254/368 |
| 7,287,303 | B2 * | 10/2007 | Yang | 24/134 R |

* cited by examiner

*Primary Examiner*—Evan H Langdon
(74) *Attorney, Agent, or Firm*—Alan Kamrath; Kamrath & Associates PA

(57) ABSTRACT

A pulley includes a tensioning device and a ratchet device disposed in the tensioning device. The tensioning device includes a first shell, a second shell installed to the first shell, and a first compartment defined in a side thereof. The tensioning device further includes a first block and a second block located in the first compartment, with the first and second blocks adapted to pivot in the tensioning device. The ratchet device includes an actuating element, a ratchet, a first gripping element and a second gripping element, with the ratchet, the first and second gripping elements mounted onto the first block in sequence, with the actuating element provided to control the pivoting direction of the ratchet as to limit the direction of pulling a rope, which is winded between the first and second gripping elements.

9 Claims, 5 Drawing Sheets

PULLEY

BACKGROUND OF THE INVENTION

1. Field of the Invention

The present invention relates to a pulley and, more particularly to a pulley adapted for gripping a rope.

2. Description of the Related Art

Referring to U.S. Pat. No. 5,368,281, a ratchet pulley includes a first half 11, a a ratchet mechanism 21, a first ratchet half 16 and a second ratchet half 18, with the first and second ratchet halves 16, 18 respectively having a plurality of ridges 17 formed on a side thereof toward one another, with the ratchet mechanism 21 having a projection 24 formed thereon, with a guiding surface 26 defined within the housing 12. The ridges 17 are provided to engage with the projection 24. While a rope 15 is winded on the first and second ratchet halves 16, 18, the guiding surface 26 provided for pushing the rope 15 toward the first and second ratchet halves 16, 18 as to prevent the friction between the first and second ratchet halves 16, 18 from losing. Therefore, the pulley is adapted to limit the rope 15 to be driven in one direction as to lock the rope 15.

However, to wind the rope 15 between the first and second ratchet halves 16, 18 does not facilitate for a user because of the guiding surface 26. And the structure of the first and second ratchet halves 16, 18 are complicated for manufacture as to increase the cost.

SUMMARY OF THE INVENTION

Briefly stated, the invention comprises a pulley including a tensioning device and a ratchet device which has an actuating element, a ratchet, a first gripping element and a second gripping element. The ratchet, a first gripping element and a second gripping element are respectively made by punching as to reduce cost of making molds. The actuating element can be in a first position or a second position by operating. While the actuating element is in the first position, a rope winded between the first and second gripping elements will be limited to be pulled in one direction; while the actuating element is in the second position, the rope can be pulled freely.

DETAILED DESCRIPTION OF THE PREFERRED EMBODIMENT

Figure 1:
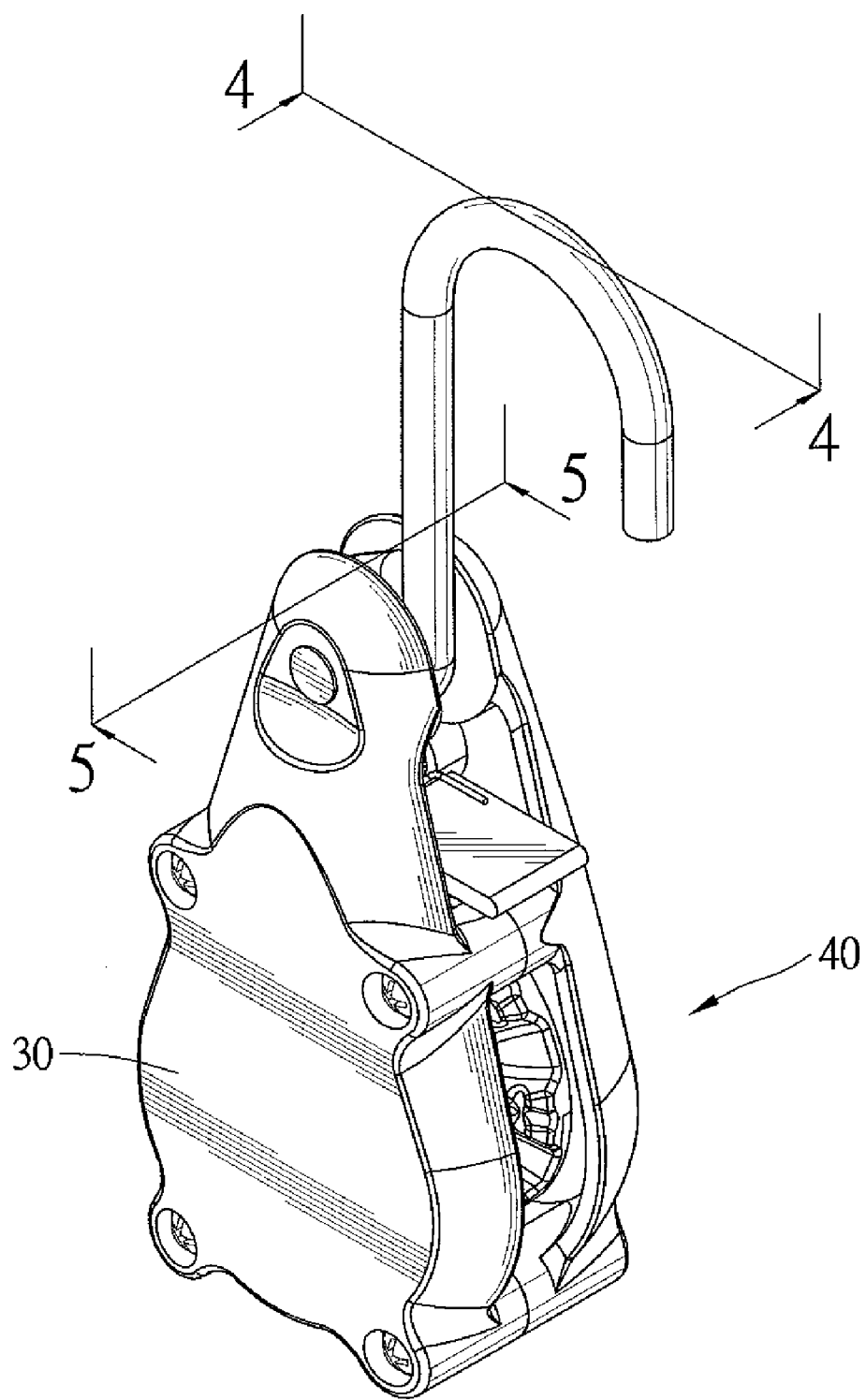
FIG. 1 shows a perspective view of a pulley according to the preferred embodiment of the present invention.
Figure 2:
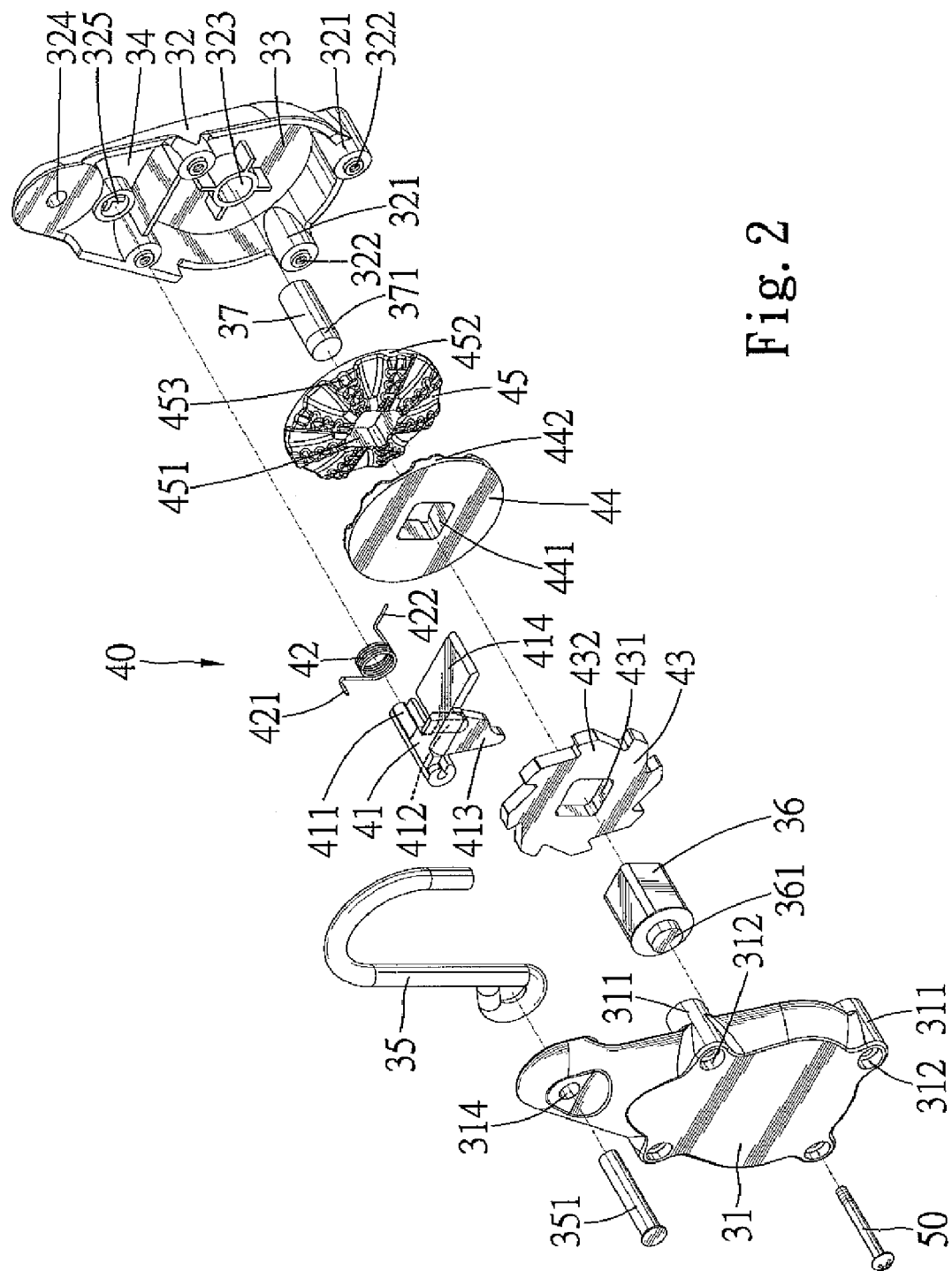
FIG. 2 shows an exploded view of the pulley in FIG. 1.
Figure 3:
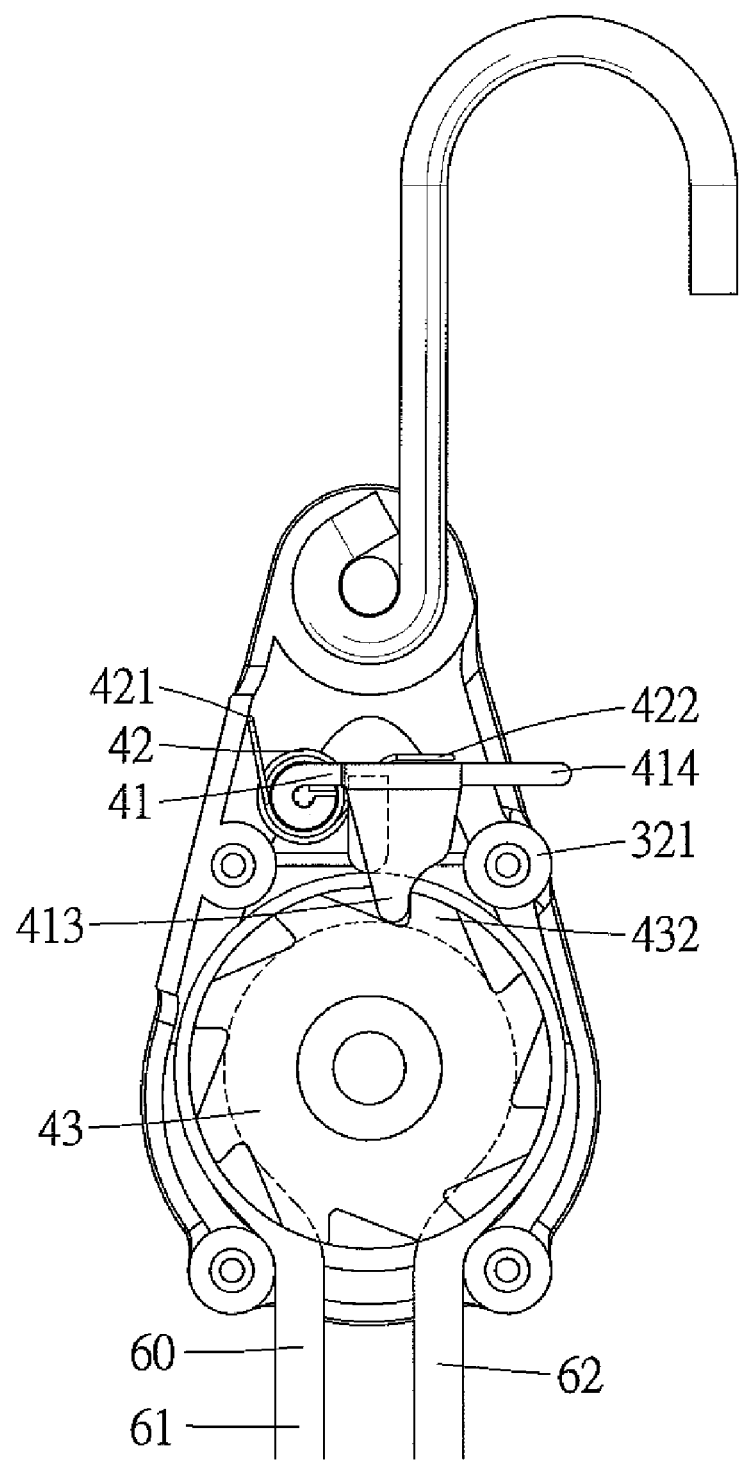
FIG. 3 shows another perspective view of a pulley according to the preferred embodiment of the present invention.
Figure 4:
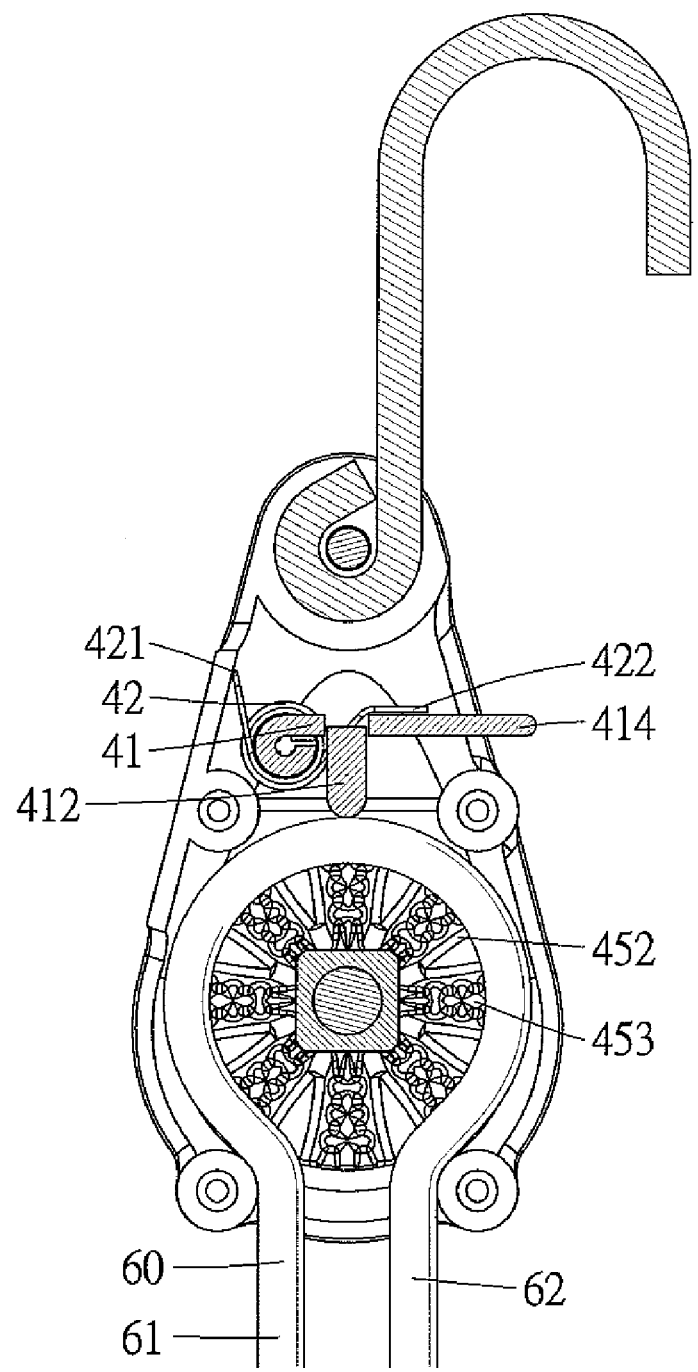
FIG. 4 is a cross-sectional view taken along 4-4 in FIG. 1.
Figure 5:
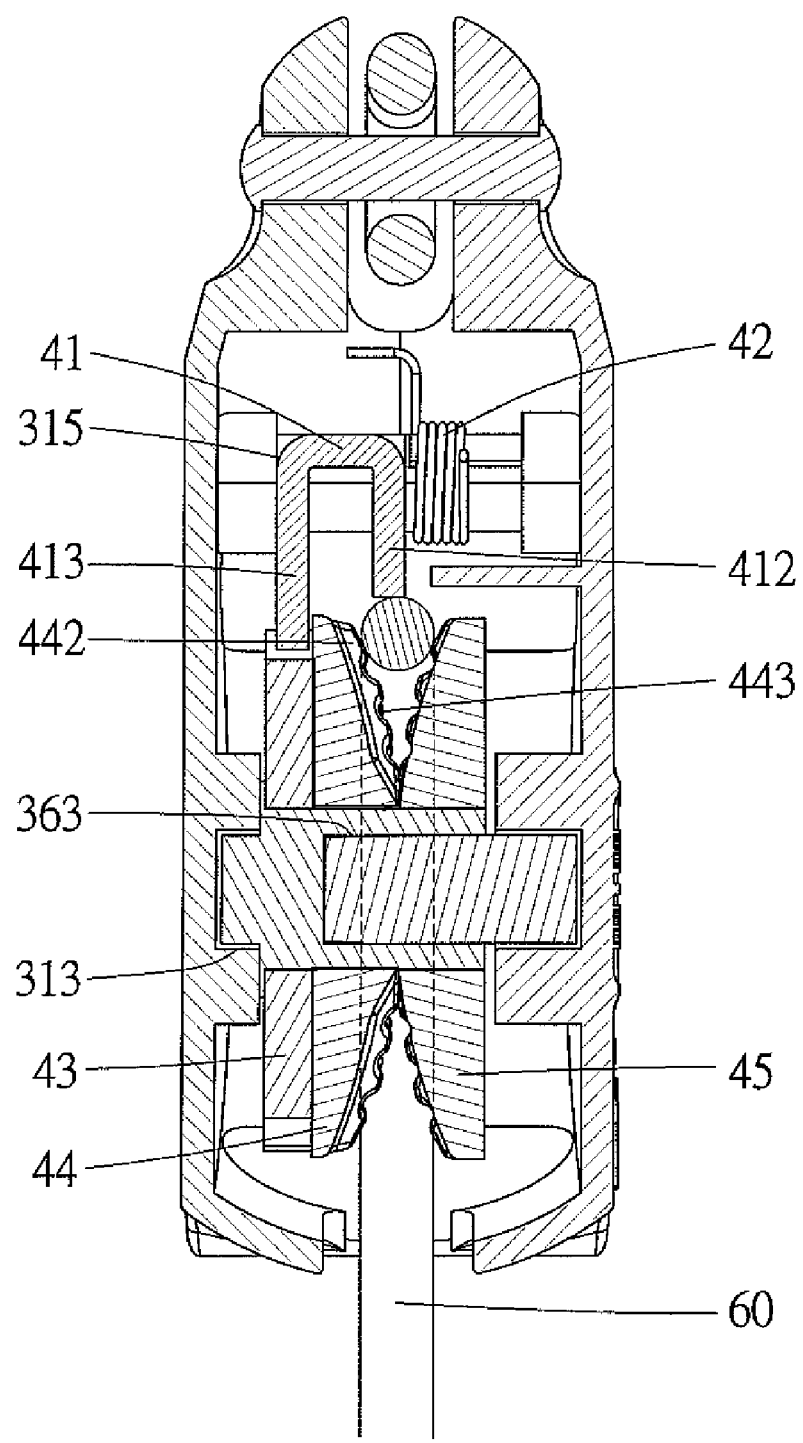
FIG. 5 is a cross-sectional view taken along 5-5 in FIG. 1.

A pulley according to the preferred embodiment of the present invention is shown in the drawings and includes a tensioning device 30 having a first shell 31 and a second shell 32, a ratchet device 40 located in the tensioning device 30, a plurality of fasteners 50 adapted for attaching the first shell 31 to the second shell 32 and a rope 60.

The tensioning device 30 is combined by the first and second shells 31, 32 and further includes a first compartment 33 defined in a side thereof and a second compartment 34 defined in another side thereof. The first shell 31 includes a plurality of first engaging portions 311 formed on the periphery thereof an engaging hole 312 defined in the center of each first engaging portion 311, a first receiving portion 313 formed on the inner wall thereof and located in the first compartment 33, a first limited hole 314 formed on the outer wall thereof, and a first inserted hole 315 formed on the inner wall thereof and located in the second compartment 34. In the preferred embodiment, there are four first engaging portions 311. The second shell 32 is similar to the first shell 31, and the fasteners 50 inserts through the first engaging portions 311 and fixed in the second engaging portions 321 as to combine the tensioning device 30.

The tensioning device 30 further includes a coupler 35, a first block 36 and a second block 37. The coupler 35 is disposed above the second compartment 34 partially and has a first end and a second end located above the second compartment 34, with the first end adapted to be U-shaped and stretching from the tensioning device 30, with the second end adapted to be O-shaped and forming a through-hole in the center thereof. The coupler 35 further includes a detachable bolt 351 provided for inserting through the first limited hole 314, the through-hole of the second end of the coupler 35 and the second limited hole 324 as to fix the coupler 35 in the tensioning device 30. The first block 36 includes a first end forming a protrusion 361 thereon and a second end forming a recess 363 thereon, with the protrusion 361 for inserting in the first receiving portion 313. The second block 37 includes a distal end 371 adapted to insert into the recess 363 and another end, which is opposite to the distal end 371, received in the second receiving portion 323. The distal end 371 has a reduced diameter, and the diameter of the second block 37 is not less than the internal diameter of the recess 363 so that while inserting the second block 37 into the recess 363, the diameter of the second end of the first block 36 will increase via the second block 37.

The ratchet device 40 is disposed in the tensioning device 30 and includes an actuating element 41, an elastic element 42, a ratchet 43, a first gripping element 44 and a second gripping element 45.

The ratchet 43 includes a hole 431 in the center thereof and a plurality of teethe 432 on the periphery thereof. The first gripping element 44 includes a hole 441 in the center thereof, a plurality of gripping portions 442 radially arranged on a side thereof against the second gripping element 45, and several notches 443 formed on the gripping portions 442. The second gripping element 45 is similar to the first gripping element 44, and gripping portions 452 of the second gripping element 45 are adapted to be against the gripping portions 442 of the first gripping element 44. Furthermore, the ratchet 43 and the first and second gripping elements 44, 45 are mounted onto the first end of the first block 36 in sequence, and the shapes of the holes 431, 441, 451 correspond to the outer periphery of the first block 36 so that the ratchet 43 and the first and second gripping elements 44, 45 can be driven to pivot by the first block 36. Furthermore, the diameter of the second end of the first block 36 will increase by inserting the second block 37, therefore, the second gripping element 45 can be mounted on the first block 36 tightly, and it prevents component parts of the ratchet device 40 scattering.

The ratchet 43 and the first and second gripping elements 44, 45 are made by punching, and the uncomplicated shape thereof can reduce the cost and simplify the process of manufacture. Likewise, combine the ratchet 43 and the first and second gripping elements 44, 45 via punching as to reduce the finished time.

The actuating element 41 is disposed in the second compartment 34 and includes an axle 411 defined in a side thereof, a flat operating portion 414 defined in another side thereof and protruding from the tensioning device 30 for a user operating, a first restrict portion 412 disposed between the first and second gripping elements 44, 45 for blocking the rope 60, and a second restrict portion 413 protruding toward the ratchet 43 for alternatively blocking the teeth 432 of the ratchet 43. Two ends of the axle 411 are respectively received in the first and second inserted holes 315, 325 so that the actuating element 41 can pivot in the second compartment 34 related to the axle 411.

The elastic element 42 is mounted to an end of the axle 411 against the second shell 32 and includes a first end 421 and a second end 422 which both stretch therefrom, with the first end 421 abutting with the inner wall of the second compartment 34, with the second end 422 abutting with top surface of the operating portion 414.

In use, the rope 60, which is winded between the first and second gripping elements 44, 45 and gripped by the gripping portions 442, 452, defines a A end 61 and a B end 62. While the actuating element 41 is in a first position, the first end 421 abuts against the he inner wall of the second compartment 34 and the second end 422 abuts against the top surface of the operating portion 414, simultaneously, the first restrict portion 412 limits the rope 60 not to detach from the betweenness of the first and second gripping elements 44, 45, and the second restrict portion 413 abuts one of the teeth 432. Therefore, when the user pulls the A end 61 of the rope 60, the ratchet 43 can not be driven to pivot via the second restrict portion 413 abutting one of the teeth 432, however, when the user pulls the B end 62 of the rope 60, the teeth 432 of the ratchet 43 pushes the second restrict portion 413 of the actuating element 41 and the operating portion 414 of the actuating element 41 presses the elastic element 42 as to detach the first restrict portion 412 from the rope 60. The rope 60, hence, is limited to be pulled in one direction.

While the user operates the operating portion 414 of the actuating element 41 to drive the actuating element to pivot counterclockwise related to the axle 411, the actuating element 41 is in a second position. The first restrict portion 412 is detached form the rope 60 and the second restrict portion 413 is detached from the teeth 432 of the ratchet 43 so that the user is easy to dispose the rope 60 in the pulley. The ratchet 43 and the first and second gripping elements 44, 45 can pivot in the first compartment 33 freely. And the user can alternatively pull the A and B ends 61, 62 of the rope 60.

What is claimed is:

1. A pulley, comprising:
   a tensioning device which is the combination of a first shell and a second shell including a first compartment defined in a side of the interior of one of the first and second shells, a second compartment defined in the other side of the interior opposite to the first compartment, a first block pivotally connecting to the first shell and located in the first compartment, and a second block pivotally connecting to the second shell and located in the first compartment, with the first and second blocks connecting to each other; and
   a ratchet device disposed in the tensioning device and including a ratchet, a first gripping element, a second gripping element and an actuating element pivotally installed in the second compartment, with the ratchet and the first and second gripping elements mounted onto the first block in sequence;
   wherein the actuating element includes a first restrict portion formed thereon and projecting downward therefrom between the first and second gripping elements and a second restrict portion protruding therefrom and adapted to block the ratchet.

2. The pulley as claimed in claim 1 further comprising a first receiving hole located in the first compartment on the first shell and a second receiving hole located in the first compartment on the second shell and corresponding to the first receiving hole, with the first block received in the first receiving hole and the second block received in the second receiving hole.

3. The pulley as claimed in claim 2, with the first block including a protrusion adapted to insert in the first receiving hole and a recess formed opposite to the protrusion, with the second block including a distal end adapted to be received in the recess of the first block and another end opposite to the distal end adapted to insert in the second receiving hole.

4. The pulley as claimed in claim 3, with the distal end of the second block having a reduced diameter.

5. The pulley as claimed in claim 1, with the ratchet having a hole therethrough, with the first gripping element having a hole therethrough, with the second gripping element having a hole therethrough; wherein the shapes of the holes correspond to the outer periphery of the first block.

6. The pulley as claimed in claim 1, with the first gripping element including a plurality of gripping portions radially arranged thereon against the second gripping element, with the second gripping element including a plurality of gripping portions radially arranged thereon against the gripping portions of the first gripping element; wherein the gripping portions have a plurality of notches thereon as to retain a rope in the pulley.

7. The pulley as claimed in claim 1, with the first shell including a first inserted hole in the second compartment and the second shell including a second inserted hole in the second compartment relative to the first shell, with the actuating element including an axle and an operating portion, wherein two ends of the axle are respectively received in the first and second inserted holes, and the operating portion protrudes form the tensioning device and is provided for operating.

8. The pulley as claimed in claim 7, the ratchet device including an elastic element mounted on the axle adjacent to the second shell; wherein the elastic element has a first end and a second end stretching therefrom, with the first end abutting with the inner wall of the second compartment and the second end abutting with the operating portion of the actuating element.

9. The pulley as claimed in claim 1, with the tensioning device including a coupler partially disposed therein and having a detachable bolt, with the first shell including a first limited hole formed therethrough and the second shell including a second limited hole formed therethrough relative to the first limited hole; wherein the coupler includes a U-shaped first end stretching from the tensioning device and a O-shaped second end disposed in the tensioning device; wherein the bolt is adapted to insert the first limited hole, the second end of the coupler and the second limited hole as to retain the coupler with the tensioning device.

* * * * *